US011385683B2

(12) United States Patent
Vartanian

(10) Patent No.: US 11,385,683 B2
(45) Date of Patent: *Jul. 12, 2022

(54) MOBILE ELECTRONIC DEVICE WITH AN ADAPTIVELY RESPONSIVE FLEXIBLE DISPLAY

(71) Applicant: Apple Inc., Cupertino, CA (US)

(72) Inventor: Harry Vartanian, Philadelphia, PA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/069,749

(22) Filed: Oct. 13, 2020

(65) Prior Publication Data

US 2021/0064094 A1 Mar. 4, 2021

Related U.S. Application Data

(63) Continuation of application No. 16/280,916, filed on Feb. 20, 2019, now Pat. No. 10,802,543, which is a
(Continued)

(51) Int. Cl.
*G06F 1/16* (2006.01)
*H04W 4/02* (2018.01)
(Continued)

(52) U.S. Cl.
CPC .......... *G06F 1/1652* (2013.01); *G06F 1/1641* (2013.01); *G06F 1/1647* (2013.01);
(Continued)

(58) Field of Classification Search
CPC ......... G06F 1/1652; G06F 2203/04102; G06F 1/1641; G06F 1/1647; G06F 1/1677; G06F 1/3202; G06F 3/03; G06F 3/0346; G06F 3/0412; G06F 3/04845; H04M 1/0268; H04M 1/7243; H04W 4/18; H04W 4/029; H04W 4/02; H04W 4/12; H04W 4/14;
(Continued)

(56) References Cited

U.S. PATENT DOCUMENTS 6,016,176 A 1/2000 Kim et al.
6,047,196 A 4/2000 Makela et al.
(Continued)

FOREIGN PATENT DOCUMENTS

TW 200729022 8/2007
WO 2004086338 3/2005
(Continued)

OTHER PUBLICATIONS

3rd Generation Partnership Project, Technical Specification Group Terminals, Technical Realization of the Short Message Service (SMS) (Release 1998), 3GPP TS 0340 V75.0 (Dec. 2001), pp. 118.
(Continued)

*Primary Examiner* — John J Lee
(74) *Attorney, Agent, or Firm* — Joseph F. Guihan

(57) ABSTRACT

A mobile electronic device having a flexible display device is disclosed. A request to retrieve information from a server over a wireless network is triggered based on flexing the flexible display device and other gestures.

14 Claims, 5 Drawing Sheets

Related U.S. Application Data continuation of application No. 15/598,137, filed on May 17, 2017, now Pat. No. 10,241,543, which is a continuation of application No. 15/132,030, filed on Apr. 18, 2016, now Pat. No. 9,684,341, which is a continuation of application No. 14/496,885, filed on Sep. 25, 2014, now Pat. No. 9,332,113, which is a continuation of application No. 14/033,691, filed on Sep. 23, 2013, now Pat. No. 8,855,727, which is a continuation of application No. 13/775,135, filed on Feb. 23, 2013, now Pat. No. 8,554,286, which is a continuation of application No. 13/586,809, filed on Aug. 15, 2012, now Pat. No. 8,396,517, which is a continuation of application No. 13/272,618, filed on Oct. 13, 2011, now Pat. No. 8,346,319, which is a continuation of application No. 13/083,770, filed on Apr. 11, 2011, now Pat. No. 8,068,886, which is a continuation of application No. 12/185,406, filed on Aug. 4, 2008, now Pat. No. 7,953,462.

(51) Int. Cl.

| | |
|---|---|
| *G06Q 30/02* | (2012.01) |
| *H04M 1/02* | (2006.01) |
| *H04W 4/18* | (2009.01) |
| *H04W 4/029* | (2018.01) |
| *H04M 1/7243* | (2021.01) |
| *G06F 3/03* | (2006.01) |
| *G06F 3/041* | (2006.01) |
| *H04W 4/12* | (2009.01) |
| *G06F 1/3206* | (2019.01) |
| *G06F 3/0346* | (2013.01) |
| *G06F 3/04845* | (2022.01) |
| *G09G 5/00* | (2006.01) |
| *G09G 5/14* | (2006.01) |
| *G09G 5/373* | (2006.01) |
| *H04W 4/14* | (2009.01) |

(52) U.S. Cl.
CPC .......... *G06F 1/1677* (2013.01); *G06F 1/3206* (2013.01); *G06F 3/03* (2013.01); *G06F 3/0346* (2013.01); *G06F 3/0412* (2013.01); *G06F 3/04845* (2013.01); *G06Q 30/02* (2013.01); *G06Q 30/0261* (2013.01); *G09G 5/005* (2013.01); *G09G 5/14* (2013.01); *G09G 5/373* (2013.01); *H04M 1/0268* (2013.01); *H04M 1/7243* (2021.01); *H04W 4/02* (2013.01); *H04W 4/029* (2018.02); *H04W 4/12* (2013.01); *H04W 4/18* (2013.01); *G09G 2370/02* (2013.01); *G09G 2370/16* (2013.01); *H04W 4/14* (2013.01)

(58) Field of Classification Search
CPC ...... G06Q 30/02; G06Q 30/0261; G09G 5/14; G09G 5/373; G09G 2370/02; G09G 2370/16
USPC .......... 455/566, 550.1, 575.1, 90.3
See application file for complete search history.

(56) References Cited

U.S. PATENT DOCUMENTS

| | | | |
|---|---|---|---|
| 6,094,492 A | 7/2000 | Boesen | |
| 6,144,358 A | 11/2000 | Narayanaswamy et al. | |
| 6,184,847 B1 | 2/2001 | Fateh et al. | |
| 6,288,704 B1 | 9/2001 | Flack et al. | |
| 6,311,076 B1 | 10/2001 | Peuhu et al. | |
| 6,327,482 B1 | 12/2001 | Miyashita | |
| 6,526,296 B1 | 2/2003 | Nieminen | |
| 6,556,586 B1 | 4/2003 | Sipila | |
| 6,567,101 B1 | 5/2003 | Thomas | |
| 6,636,203 B1 | 10/2003 | Wong et al. | |
| 6,643,124 B1 | 11/2003 | Wilk | |
| 6,646,626 B1 | 11/2003 | Uskali et al. | |
| 6,697,083 B1 | 2/2004 | Yoon | |
| 6,748,249 B1 | 6/2004 | Eromaki et al. | |
| 6,792,293 B1 | 9/2004 | Awan et al. | |
| 6,859,451 B1 | 2/2005 | Pastemack et al. | |
| 6,943,773 B2 | 9/2005 | Wong et al. | |
| 6,988,247 B2 | 1/2006 | Janevski | |
| 7,027,311 B2 | 4/2006 | Vanderelli et al. | |
| 7,042,711 B2 | 5/2006 | Tanaka et al. | |
| 7,050,835 B2 | 5/2006 | Hack et al. | |
| 7,109,967 B2 | 9/2006 | Hioki et al. | |
| 7,136,282 B1 | 11/2006 | Rebeske | |
| 7,136,688 B2 | 11/2006 | Jung et al. | |
| 7,138,985 B2 | 11/2006 | Nakajima | |
| 7,142,195 B2 | 11/2006 | Northway et al. | |
| 7,230,599 B2 | 6/2007 | Wu et al. | |
| 7,242,315 B2 | 7/2007 | Affolter et al. | |
| 7,253,807 B2 | 8/2007 | Nakajima | |
| 7,302,254 B2 | 11/2007 | Valloppillil | |
| 7,324,093 B1 | 1/2008 | Gettemy et al. | |
| 7,340,077 B2 | 3/2008 | Gokturk et al. | |
| 7,368,307 B2 | 5/2008 | Cok | |
| 7,376,449 B2 | 5/2008 | Mizuta et al. | |
| 7,394,452 B2 | 7/2008 | Wong et al. | |
| 7,430,452 B2 | 9/2008 | Cromer et al. | |
| 7,445,189 B2 | 11/2008 | Cox et al. | |
| 7,469,381 B2 | 12/2008 | Ording | |
| 7,522,153 B2 | 4/2009 | Ohtsuka | |
| 7,581,166 B2 | 8/2009 | Renger et al. | |
| 7,610,069 B2 | 10/2009 | Kwak et al. | |
| 7,623,105 B2 | 11/2009 | Li et al. | |
| 7,633,744 B2 | 12/2009 | Kuhn | |
| 7,656,393 B2 | 2/2010 | King et al. | |
| 7,679,604 B2 | 3/2010 | Uhlik et al. | |
| 7,751,805 B2 | 7/2010 | Neven et al. | |
| 7,867,285 B2 | 1/2011 | Clausen et al. | |
| 7,880,718 B2 | 2/2011 | Cradick et al. | |
| 7,889,174 B2 | 2/2011 | Culver | |
| 7,894,865 B2 | 2/2011 | Kim | |
| 7,898,429 B2 | 3/2011 | Hwang et al. | |
| 7,930,003 B2 | 4/2011 | Park et al. | |
| 7,953,462 B2 | 5/2011 | Vartanian | |
| 7,962,128 B2 | 6/2011 | Neven et al. | |
| 7,978,176 B2 | 7/2011 | Forstall et al. | |
| 7,978,177 B2 | 7/2011 | Nash et al. | |
| 8,009,421 B2 * | 8/2011 | Misawa | G09F 11/02 361/679.55 |
| 8,068,886 B2 | 11/2011 | Vartanian | |
| 8,106,856 B2 | 1/2012 | Matas et al. | |
| 8,269,746 B2 | 9/2012 | Hodges et al. | |
| 8,346,319 B2 | 1/2013 | Vartanian | |
| 8,396,517 B2 | 3/2013 | Vartanian | |
| 8,478,347 B2 | 7/2013 | Kim et al. | |
| 8,543,166 B2 | 9/2013 | Choi et al. | |
| 8,554,286 B2 | 10/2013 | Vartanian | |
| 2002/0167481 A1 | 11/2002 | Wong et al. | |
| 2003/0050019 A1 | 3/2003 | Dowling et al. | |
| 2003/0227441 A1 | 12/2003 | Hioki et al. | |
| 2004/0008191 A1 * | 1/2004 | Poupyrev | G06F 3/011 345/184 |
| 2004/0039789 A1 | 2/2004 | Jackson et al. | |
| 2004/0198474 A1 | 10/2004 | Jung et al. | |
| 2004/0198477 A1 | 10/2004 | Jung et al. | |
| 2004/0203520 A1 | 10/2004 | Schirtzinger et al. | |
| 2004/0217877 A1 | 11/2004 | Kokonaski et al. | |
| 2004/0252332 A1 | 12/2004 | McCoog et al. | |
| 2004/0253931 A1 | 12/2004 | Bonnelykke et al. | |
| 2005/0111041 A1 | 5/2005 | Salmi et al. | |
| 2005/0130611 A1 | 6/2005 | Lu et al. | |
| 2005/0174261 A1 | 8/2005 | Laumen et al. | |
| 2005/0185661 A1 | 8/2005 | Scott et al. | |
| 2006/0055663 A1 | 3/2006 | Ohtsuka | |
| 2006/0096392 A1 | 5/2006 | Inkster et al. | |
| 2006/0139448 A1 | 6/2006 | Ha et al. | |

(56) References Cited

U.S. PATENT DOCUMENTS

| | | |
|---|---|---|
| 2006/0146009 A1 | 7/2006 | Syrbe et al. |
| 2006/0156218 A1 | 7/2006 | Lee |
| 2006/0194619 A1 | 8/2006 | Wilcox et al. |
| 2006/0206215 A1 | 9/2006 | Clausen et al. |
| 2006/0232663 A1 | 10/2006 | Gandhi et al. |
| 2006/0238494 A1* | 10/2006 | Narayanaswami ..... G06F 3/011 345/156 |
| 2006/0240862 A1 | 10/2006 | Neven et al. |
| 2006/0259637 A1 | 11/2006 | Yadav et al. |
| 2006/0281446 A1 | 12/2006 | Lai et al. |
| 2007/0046643 A1 | 3/2007 | Hillis et al. |
| 2007/0060217 A1 | 3/2007 | Kim |
| 2007/0085837 A1 | 4/2007 | Ricks et al. |
| 2007/0085838 A1 | 4/2007 | Ricks et al. |
| 2007/0085845 A1 | 4/2007 | Kikuchi et al. |
| 2007/0100942 A1 | 5/2007 | Lin et al. |
| 2007/0105528 A1 | 5/2007 | Haas et al. |
| 2007/0139391 A1 | 6/2007 | Bischoff |
| 2007/0165372 A1 | 7/2007 | Ye |
| 2007/0198633 A1 | 8/2007 | Thibeault |
| 2007/0208879 A1 | 9/2007 | Liu |
| 2007/0220427 A1 | 9/2007 | Braincon et al. |
| 2007/0232336 A1 | 10/2007 | Kim et al. |
| 2007/0242310 A1 | 10/2007 | Chae |
| 2007/0247422 A1 | 10/2007 | Vertegaal et al. |
| 2007/0259685 A1 | 11/2007 | Engbiom et al. |
| 2007/0264975 A1 | 11/2007 | Bae et al. |
| 2007/0268246 A1 | 11/2007 | Hyatt |
| 2007/0283269 A1 | 12/2007 | Obrador et al. |
| 2007/0287437 A1 | 12/2007 | Cartmell |
| 2007/0298850 A1 | 12/2007 | Miyata et al. |
| 2008/0021963 A1 | 1/2008 | Jana et al. |
| 2008/0034056 A1 | 2/2008 | Renger et al. |
| 2008/0040498 A1 | 2/2008 | Setlur et al. |
| 2008/0046577 A1 | 2/2008 | Temple et al. |
| 2008/0117184 A1 | 5/2008 | Gettemy |
| 2008/0124982 A1 | 5/2008 | Kim et al. |
| 2008/0132287 A1 | 6/2008 | Choi |
| 2008/0151480 A1 | 6/2008 | Chung et al. |
| 2008/0167095 A1 | 7/2008 | Kim et al. |
| 2008/0294991 A1 | 11/2008 | Wong et al. |
| 2008/0303782 A1 | 12/2008 | Grant et al. |
| 2009/0025022 A1 | 1/2009 | Blatchley et al. |
| 2009/0061901 A1 | 3/2009 | Arravuori et al. |
| 2009/0135145 A1 | 5/2009 | Chen et al. |
| 2009/0156170 A1 | 6/2009 | Rossano et al. |
| 2009/0158136 A1 | 6/2009 | Rossano et al. |
| 2009/0167737 A1 | 7/2009 | Chen et al. |
| 2009/0174658 A1 | 7/2009 | Blatchley et al. |
| 2009/0184981 A1 | 7/2009 | de Matos |
| 2009/0227283 A1 | 9/2009 | Pylvanainen |
| 2009/0282332 A1 | 11/2009 | Porat |
| 2010/0007613 A1 | 1/2010 | Costa |
| 2010/0011291 A1 | 1/2010 | Nurmi |
| 2010/0045705 A1 | 2/2010 | Vertegaal et al. |
| 2010/0053073 A1 | 3/2010 | Cohen et al. |
| 2010/0056223 A1 | 3/2010 | Choi et al. |
| 2010/0060548 A1 | 3/2010 | Choi et al. |
| 2010/0066685 A1 | 3/2010 | Cain et al. |
| 2010/0134312 A1 | 6/2010 | Park et al. |
| 2010/0141605 A1 | 6/2010 | Kang et al. |
| 2010/0173678 A1 | 7/2010 | Kim et al. |
| 2010/0188422 A1 | 7/2010 | Shingal et al. |
| 2010/0207745 A1 | 8/2010 | Kim et al. |
| 2010/0220065 A1 | 9/2010 | Ma |
| 2010/0234073 A1 | 9/2010 | Kusano |
| 2010/0260373 A1 | 10/2010 | Neven et al. |
| 2011/0296506 A1 | 12/2011 | Caspi |
| 2011/0300910 A1 | 12/2011 | Choi |
| 2012/0268580 A1 | 10/2012 | Kim et al. |
| 2012/0293406 A1 | 11/2012 | Park et al. |
| 2013/0234927 A1 | 9/2013 | Roh |

FOREIGN PATENT DOCUMENTS

| | | |
|---|---|---|
| WO | 2007012899 | 2/2007 |
| WO | 2007073584 | 7/2007 |
| WO | 2007139349 | 12/2007 |
| WO | 2007144549 | 12/2007 |
| WO | 2009050812 | 4/2009 |

OTHER PUBLICATIONS

3rd Generation Partnership Project; Technical Specification Group Core Network and Terminals; Multimedia Messaging Service (MMS); Functional description; Stage 2 (Release 6), 3GPP TS 23.140 v6.15.0 (Mar. 2008), pp. 220.

3rd Generation Partnership Project; Technical Specification Group Services and System Aspects; Multimedia Messaging Services (MMS); Stage 1 (Release 7), 3GPP TS 22140 v70.0 (Jun. 2007), pp. 18.

Final Office Action dated Sep. 15, 2011 in U.S. Appl. No. 13/083,770, Harry Vartanian, filed Apr. 11, 2011.

Nokia Corporation, "How to Create MMS Services", Version 3.2, Sep. 6, 2002, pp. 37.

Non-Final Office Action dated May 23, 2011 in U.S. Appl. No. 13/083,770, Harry Vartanian, filed Apr. 11, 2011.

Non-Final Office Action dated Nov. 23, 2011 in U.S. Appl. No. 13/272,618, Harry Vartanian, filed Oct. 13, 2011.

Notice of Allowance dated Aug. 24, 2012 in U.S. Appl. No. 13/272,618, Harry Vartanian, filed Oct. 13, 2011.

Notice of Allowance dated Feb. 22, 2011 in U.S. Appl. No. 12/185,406, Harry Vartanian, filed Aug. 4, 2008.

Notice of Allowance dated Mar. 21, 2012 in U.S. Appl. No. 13/272,618, Harry Vartanian, filed Oct. 13, 2011.

Notice of Allowance dated Oct. 17, 2011 in U.S. Appl. No. 13/083,770, Harry Vartanian, filed Apr. 11, 2011.

Notice of Allowance dated Oct. 30, 2012 in U.S. Appl. No. 13/586,809, Harry Vartanian, filed Aug. 15, 2012.

Reply to Final Office Action from U.S. Appl. No. 13/083,770 dated Sep. 26, 2011.

Reply to Non-final Office Action from U.S. Appl. No. 13/272,618 dated Feb. 20, 2012.

Request for Continued Examination from U.S. Appl. No. 13/272,618 dated May 21, 2012.

Non-Final Office Action dated Jul. 18, 2013 in U.S. Appl. No. 13/775,135, Harry Vartanian, filed Feb. 23, 2013.

Reply to Non-final Office Action from U.S. Appl. No. 13/775,135 dated Jul. 21, 2013.

Notice of Allowance dated Aug. 29, 2013 in U.S. Appl. No. 13/775,135, Harry Vartariian, filed Feb. 23, 2013.

* cited by examiner

MOBILE ELECTRONIC DEVICE WITH AN ADAPTIVELY RESPONSIVE FLEXIBLE DISPLAY

CROSS REFERENCE TO RELATED APPLICATIONS

This application is a continuation of U.S. patent application Ser. No. 16/280,916 filed Feb. 20, 2019, which is a continuation of U.S. patent application Ser. No. 15/598,137, filed May 17, 2017, which issued as U.S. Pat. No. 10,241,543 on Mar. 26, 2019, which is a continuation of U.S. patent application Ser. No. 15/132,030, filed Apr. 18, 2016, which issued as U.S. Pat. No. 9,684,341 on Jun. 20, 2017, which is a continuation of U.S. patent application Ser. No. 14/496,885, filed Sep. 25, 2014, which issued as U.S. Pat. No. 9,332,113 on Oct. 7, 2014 which is a continuation of U.S. patent application Ser. No. 14/033,691 filed Sep. 23, 2013, which issued as U.S. Pat. No. 8,855,727 on Oct. 7, 2014, which is a continuation of U.S. patent application Ser. No. 13/775,135 filed Feb. 23, 2013, which issued as U.S. Pat. No. 8,554,286 on Oct. 8, 2013, which is a continuation of U.S. patent application Ser. No. 13/586,809 filed Aug. 15, 2012, which issued as U.S. Pat. No. 8,396,517 on Mar. 12, 2013, which is a continuation of U.S. patent application Ser. No. 13/272,678 filed Oct. 13, 2011, which issued as U.S. Pat. No. 8,346,319 on Jan. 1, 2013, which is a continuation of U.S. patent application Ser. No. 13/083,770 filed Apr. 11, 2011, which issued as U.S. Pat. No. 8,068,886 on Nov. 29, 2011, which is a continuation of U.S. patent application Ser. No. 12/185,406 filed Aug. 4, 2008, which issued as U.S. Pat. No. 7,953,462 on May 31, 2011, the contents of which are all incorporated by reference herein as if fully set forth.

TECHNICAL FIELD

The present invention relates to an apparatus and method to communicate multimedia documents or content to a mobile or fixed device over a wireless network. In particular, the mobile or fixed device may be configured as a digital periodical or advertising device to transmit and receive converted multimedia documents or content delivered using multimedia messaging service over a wireless network.

BACKGROUND

Wireless communications has enabled widespread easy access to mass media and multimedia information via mobile devices, cellular phones, personal digital assistants, smart phones, or the like. Although the availability of multimedia information is ubiquitous, proper viewing, display, and delivery of information for an enjoyable user experience is still lacking. This is especially the case for viewing periodicals such as online magazines or news content on a mobile device where a large display is desirable. Moreover, having complex software and hardware is required to receive and display multimedia periodical information on present mobile devices making them expensive, heavy, and power intensive.

Digital fixed advertising display systems are commonplace in urban environments. However, widespread use of these systems is not commonplace since they require a fixed power source and wired network connection. This is problematic for rural and remote locations such as highways and light or utility posts where access to power and communications infrastructure is limited. Moreover, digital advertising systems do not provide any interactivity, location awareness, or accessibility to Internet content making them poor for creating impressions on consumers and constraining their effectiveness.

Organic light emitting diode (OLED), liquid crystal display (LCD) flexible device technology, and other flexible substrate technologies have made advancements recently promising to provide an enhanced user experience, larger display sizes, portability, and low power consumption. However, commercialization of products having flexible displays has been slow due to a lack of viable and robust consumer applications. Moreover, another problem with devices having flexible displays is the ability to integrate other electronic circuitry due to form factor constraints and poor design.

Multimedia Messaging Service (MMS) is a standardized technology being developed by the Third Generation Partnership Project (3GPP), the Third Generation Partnership Project 2 (3GPP2), and the Open Mobile Alliance (OMA). Although originally developed to send photos and simple video clips, recently added features to MMS have expanded its capabilities. The added features to MMS have made it into the preferable transport and presentation mechanism of mobile messaging that rivals electronic mail. However, the commercial applications and utilization of advanced MMS features has been limited. It is desirable to provide a digital periodical or advertising device preferably having a flexible display for receiving diverse mass media information, multimedia information, or Internet content in an efficient manner using MMS.

SUMMARY

An apparatus and method for delivering mass media and multimedia information to a digital periodical or advertising device preferably using Multimedia Messaging Service (MMS) and having an electronic flexible screen or display is disclosed. A multimedia document, part of a multimedia document, web page, multimedia advertisement, or any other multimedia content on a server or a computer is extracted, parsed, and/or segmented into a plurality of video, audio, image, or text elements. The plurality of elements are each converted to an MMS message and transmitted optionally with an MMS assembler message or embedded information in each MMS message for proper reassembly of the original multimedia document or content. The MMS messages are received and reassembled back into the original multimedia document or content at a digital periodical or advertising device.

BRIEF DESCRIPTION OF THE DRAWINGS

A more detailed understanding of the invention may be had from the following description, given by way of details and to be understood in conjunction with the accompanying drawings wherein.

DETAILED DESCRIPTION

Figure 1:
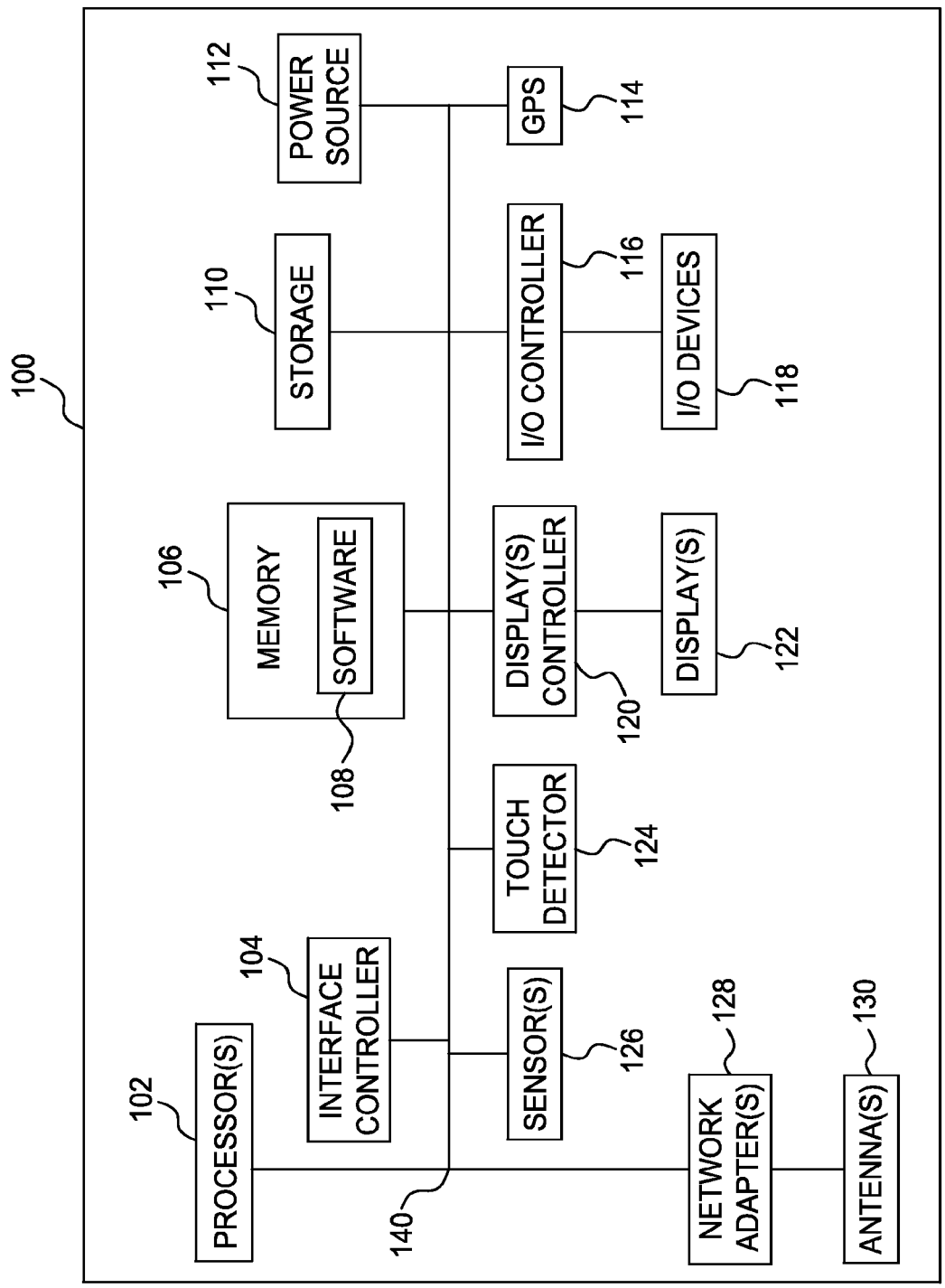
FIG. 1 is a diagram of a digital periodical or advertising device in accordance with an embodiment of the present invention.

The present invention will be described with reference to the drawing figures wherein like numerals represent like elements throughout. FIG. 1 is a diagram of a digital periodical or advertising device 100 for mobile or fixed applications. Mobile applications include a digital newspaper, magazine, brochure, or any other digital mass media medium or apparatus. Fixed applications include a digital billboard, flyer or any other advertising medium or apparatus.

Device 100 comprises computer bus 140 that couples one or more processors 102, interface controller 104, memory 106 having software 108, storage device 110, power source 112, display controller 120, one or more displays 122, such as flexible organic light emitting diode (OLED) electronic displays, input/output (I/O) controller 116, I/O devices 118, GPS device 114, one or more network adapters 128, and one or more antennas 130. Device 100 may optionally have one or more motion, light, heat, radio frequency identification (RFID), face recognition, shape, or voice recognition sensors 126 and touch detector 124 for detecting any touch inputs, including multi-touch inputs, for one or more displays 122. Interface controller 104 communicates with touch detector 124 and I/O controller 116 for determining user inputs to device 100. Storage device 110 may be any disk based or solid state memory device for storing data. Power source 112 may be a battery, solar panels for receiving and storing solar energy, or a device for receiving and storing wireless power as described in U.S. Pat. No. 7,027,311 herein incorporated by reference as if fully set forth.

In device 100, one or more network adapters 128 may be configured as a Time Division Multiple Access (TDMA), Code Division Multiple Access (CDMA), Orthogonal Frequency-Division Multiplexing (OFDM), Orthogonal Frequency-Division Multiple Access (OFDMA), Global System for Mobile (GSM) communications, Enhanced Data rates for GSM Evolution (EDGE), General Packet Radio Service (GPRS), cdma2000, Wideband CDMA (W-CDMA), Long Term Evolution (LTE), 802.11x, Wi-Max, mobile Wi-MAX, or any other wireless or wired transceiver for modulating and demodulating information communicated via one or more antennas 130.

In one embodiment of the present invention, one or more network adapters 128 are configured to only handle data traffic thereby eliminating the need for circuitry and software for handling voice traffic. This is advantageous as the circuitry for handling and processing voice traffic in mobile devices occupies substantial space, adds complexity, and results in unneeded cost for a digital periodical device where voice capability may be unnecessary.

Figure 2:
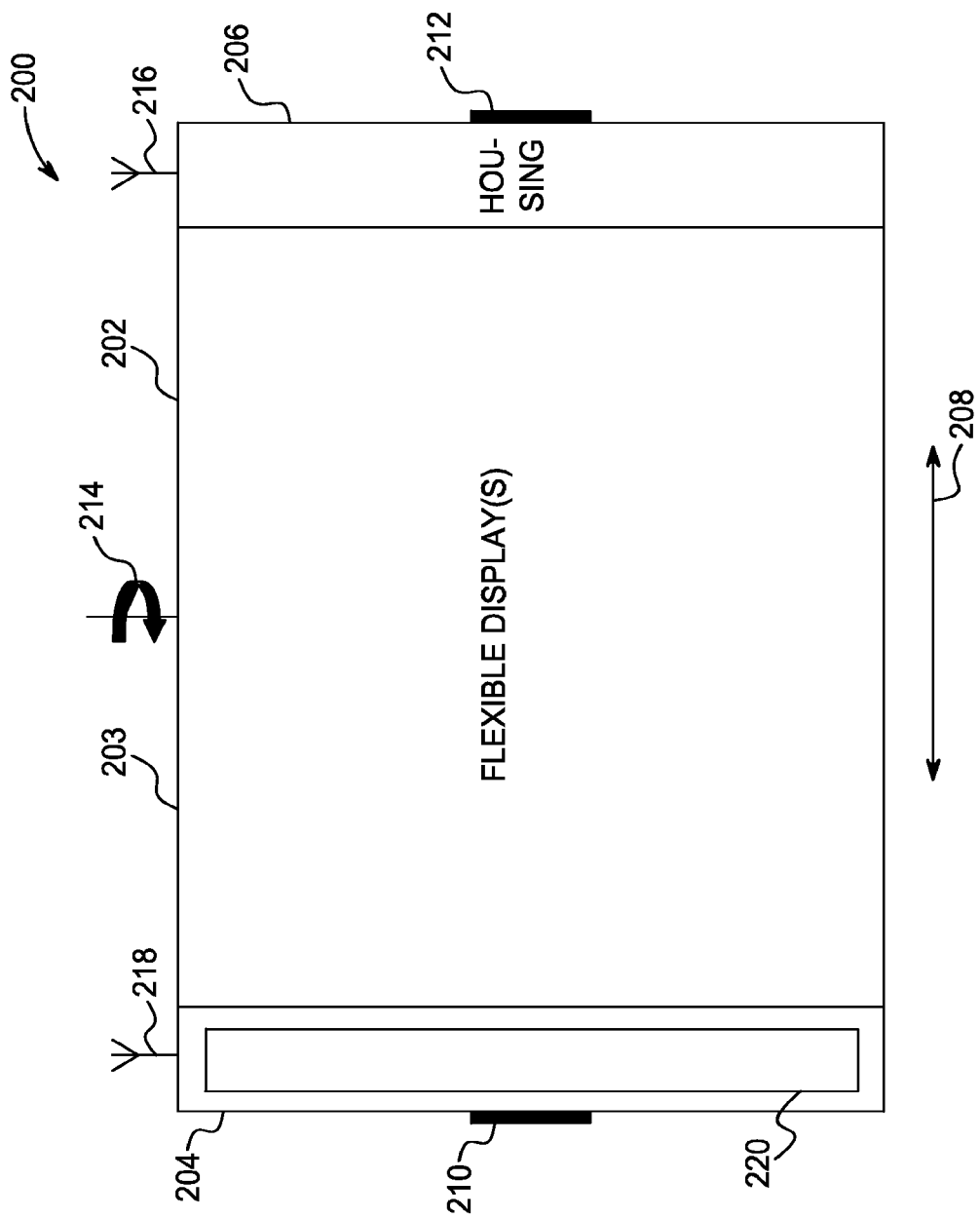
FIG. 2 is a diagram of a digital periodical or advertising device having an electronic flexible screen or display in accordance with another embodiment of the present invention.

FIG. 2 is a diagram of a digital periodical or advertising device 200 having one or more electronic flexible screen or display devices 202. The one or more electronic flexible screen or display devices 202 may be configured, manufactured, produced, or assembled based on the descriptions provided in U.S. Patent Publication Nos. 2007-247422, 2007-139391, 2007-085838, or 2006-096392 or U.S. Pat. No. 7,050,835 or WO Publication No. 2007-012899 all herein incorporated by reference as if fully set forth. The one or more electronic flexible screen or display devices 202 may be configured and assembled using organic light emitting diodes (OLED), liquid crystal displays using flexible substrate technology, flexible transistors, field emission displays (FED) using flexible substrate technology, as desired. In the case for multiple electronic flexible screens or display devices 202, rotation 214 reveals a second electronic flexible screen or display device 203 on the back of device 200.

Any one of housing members 204 and 206 selectively house certain hardware components described in device 100 such as one or more processors 102, memory 106, one or more sensors 126, and one or more network adapters 128. In one embodiment of the invention, housing members 204 and 206 may each have individual transmitting/receiving antennas 216 and 218 for providing spatial and time diversity. One or more electronic flexible screen or display devices 202 can optionally be configured to collapse 208 and roll up into housing members 204 or 206 for portability. For orientating device 200 in a circular manner for a presentation or posting on a lightpost as an advertisement, attachment members 210 and 212 may be used. Housing members 204 and 206 may be rectangular or cylindrical and provide grasping positions, the ability to position device 200 upright on a flat surface, or the ability to mount device 200 on a flat surface, as desired. It is appreciated by one skilled in the art that housing members 204 and 206 and one or more electronic flexible screen or display devices 202 are not drawn to scale. They may have different shapes and dimensions while configured to provide the same functionality provided herewith.

Still referring to FIG. 2, in another embodiment device 200 may optionally have a liquid crystal display (LCD), LED, FED, or OLED display unit 220. For this case, when one or more electronic flexible screen or display devices 202 is collapsed into housing member 206 adjacent display unit 220 is still available for displaying content. When one or more electronic flexible screen or display devices 202 is expanded out of housing member 204 or 206, the combination of display unit 220 and flexible screen or display devices 202 provides a larger screen size for a single graphical feed or for having separate graphical feeds or windows in each display unit, as desired. In this configuration, the images displayed on flexible screen or display devices 202 can be responsive to one or more sensors 126 detecting a bending of flexible screen or display devices 202.

Figure 3:
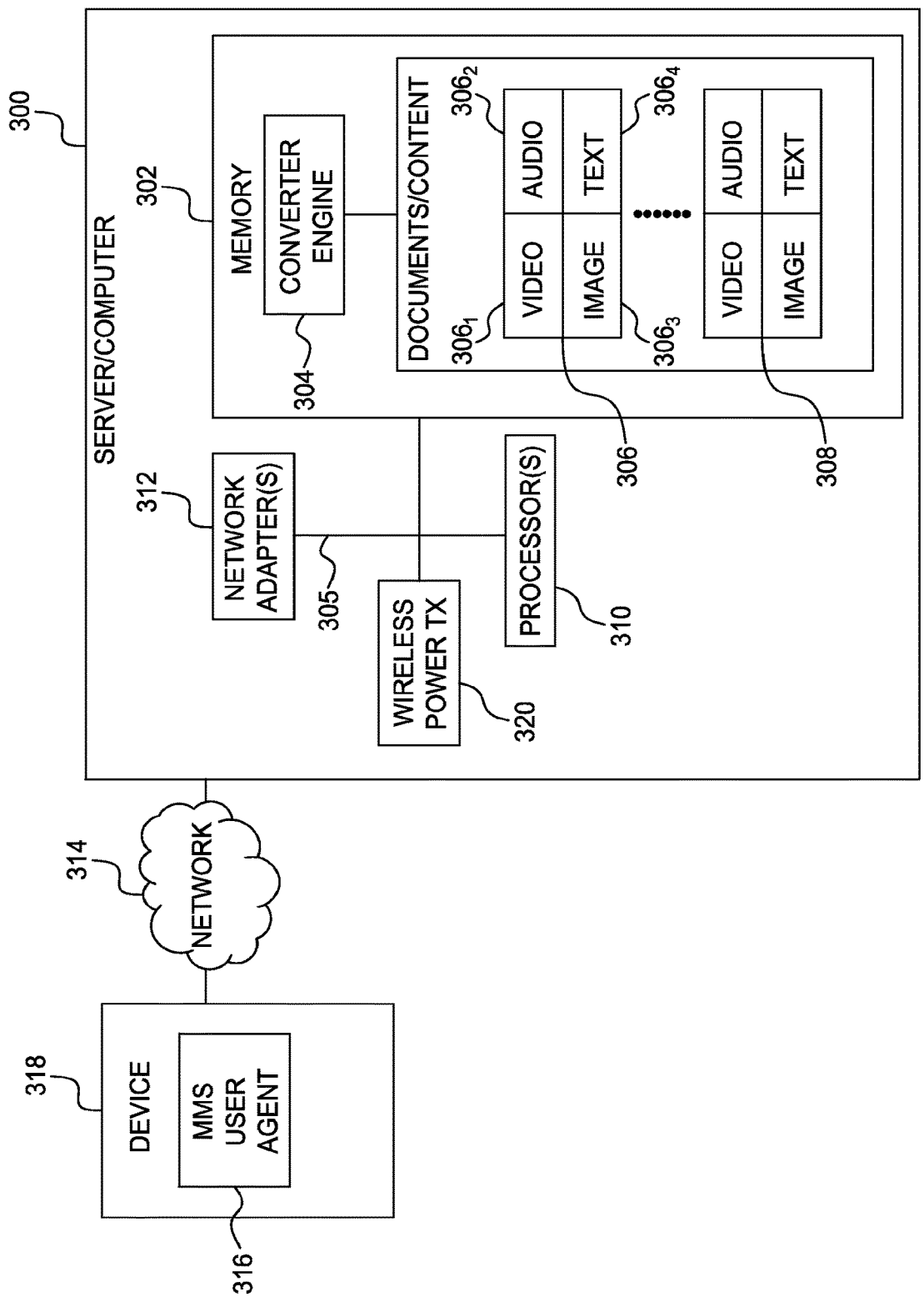
FIG. 3 is a diagram of a system for providing and communicating mass media documents, multimedia documents, or any multimedia content in accordance with another embodiment of the present invention.

FIG. 3 is a diagram of a system for providing and communicating mass media documents, multimedia documents, or any multimedia content in accordance with an embodiment of the present invention. Server or computer 300 may be configured as a web server, a multimedia messaging service center (MMSC), an MMS relay server, or a personal computer, as desired. Server or computer 300 at least comprises memory 302 coupled to one or more processors 310, one or more network adapters 312, and wireless power transmitter 320 via computer bus 305. One or more network adapters 312 may be configured to implement any one of wireless or wired technologies given above. Wireless power transmitter 320 may be configured to provide power to device 318 as described in U.S. Pat. No. 7,027,311 herein incorporated by reference as if fully set forth.

Memory 302 comprises a converter engine 304 having documents or content 306 and 308 that may be in a Microsoft WORD format, a Microsoft EXCEL format including graphs, a Portable Document Format (PDF), a PDF document having embedded multimedia advertisements including video and audio, an update for a PDF document previously transmitted for updating embedded multimedia advertisements including video and audio, a Hypertext Markup Language (HTML) format, a Microsoft PowerPoint presentation format, a digital multimedia periodical document, a digital periodical document having embedded multimedia advertisements, a digital advertising format, part of a digital advertising format, a selected subset of a multimedia document or the like having multimedia information. Converter engine 304 extracts, parses, and/or segments document 306 by detecting one or more video elements $306_1$, one or more audio elements $306_2$, one or more image elements $306_3$, or one or more text elements $306_4$. The video elements 3061 may be flash video, shockwave video, MPEG video, streaming video, Advanced Video Coding (AVC), H.264 video, or the like. The audio elements $306_2$ may be an MP3, WAV, Advanced Audio Coding (AAC), streaming audio, or the like. The image elements $306_3$ may be JPEG, TIFF, bitmap, or the like.

One or more text elements $306_4$ may represent the body of document 306 that is divided into multiple parts. Any one of elements $306_1$-$306_4$ may also represent dynamic advertising information, such as video or audio, that is embedded into document 306. The dynamic advertising information may be updated based on user preferences, a target audience, location, or the like. In an embodiment of the present invention, document 306 is a PDF document and elements $306_1$-$306_4$ sent via MMS are updates to multimedia advertising preexisting in the PDF document that are PUSHED to user agent 316 by computer or server 300.

Multimedia Messaging Service (MMS) is capable of communicating at least the following types of content:
1. Short Message Service (SMS) types;
2. plain text;
3. speech;
4. audio;
5. synthetic audio, such as Scalable Polyphony MIDI;
6. still images, such as JPEG;
7. bitmap graphics;
8. video, including streaming video;
9. vector graphics, such as Scalable Vector Graphics (SVG), Tiny 1.2, or ECMAScript;
10. File Format for dynamic media;
11. Media synchronization and presentation format;
12. Digital Rights Management (DRM) format; and
13. Extensible Markup Language (XML).

Depending on the content of document 306, elements in addition to $306_1$ to $306_4$ may be formed based on the types supported above by MMS. Once document 306 is extracted, parsed, and/or segmented into the appropriate number of elements representing its contents, each element $306_1$ to $306_4$ is converted into individual MMS messages with the recipient address of MMS user agent 316 by converter engine 304. Elements $306_1$ to $306_4$ are then transmitted over network 314 as individual MMS messages to device 318 having MMS user agent 316. Device 318 may be configured as device 100 or 200, as desired. MMS user agent 316, which may be executed by software running on one or more processors 102, reassembles document 306 using elements $306_1$ to $306_4$ received as individual MMS messages.

Reassembly may be performed selectively by loading different parts of document 306 as the individual MMS messages are received by device 318. Moreover, an MMS assembler message may optionally be transmitted by server or computer 300 having information required to properly reassemble elements $306_1$ to $306_4$ back into document or content 306. The assembler may be an individual Synchronized Multimedia Integration Language (SMIL) or Wireless Markup Language (WML) message that coordinates and explains the relationship between elements $306_1$ to $306_4$ so that it can be reassembled back into document or content 306. Alternatively, each MMS message is embedded with individual information, such as SMIL or WML language, describing the correct positioning or placement, including page number in the case of a multi-page document, and relationship to other elements within document or content 306 to display the delivered information. In an embodiment of the present invention, each received element received by device 318 may be positioned on one or more display devices 122 or 202 based on the physical position and viewing angle of one or more users detected by one or more sensors 126.

Still referring to FIG. 3, in one embodiment of the present invention elements $306_1$ to $306_4$ may delivered over network 314 using an Internet Protocol (IP) Multimedia Subsystem (IMS). Using IMS, the elements $306_1$ to $306_4$ may be packetized into IP packets by converter engine 304 so that they bypass routing through an MMSC and delivered directly to MMS user agent 316. For the case where MMS user agent 316 is in a mobile phone configured for end-to-end IP communication, elements $306_1$ to $306_4$ may be routed using an IP address included in each MMS message rather an International Mobile Subscriber Identity (IMSI).

Figure 4:
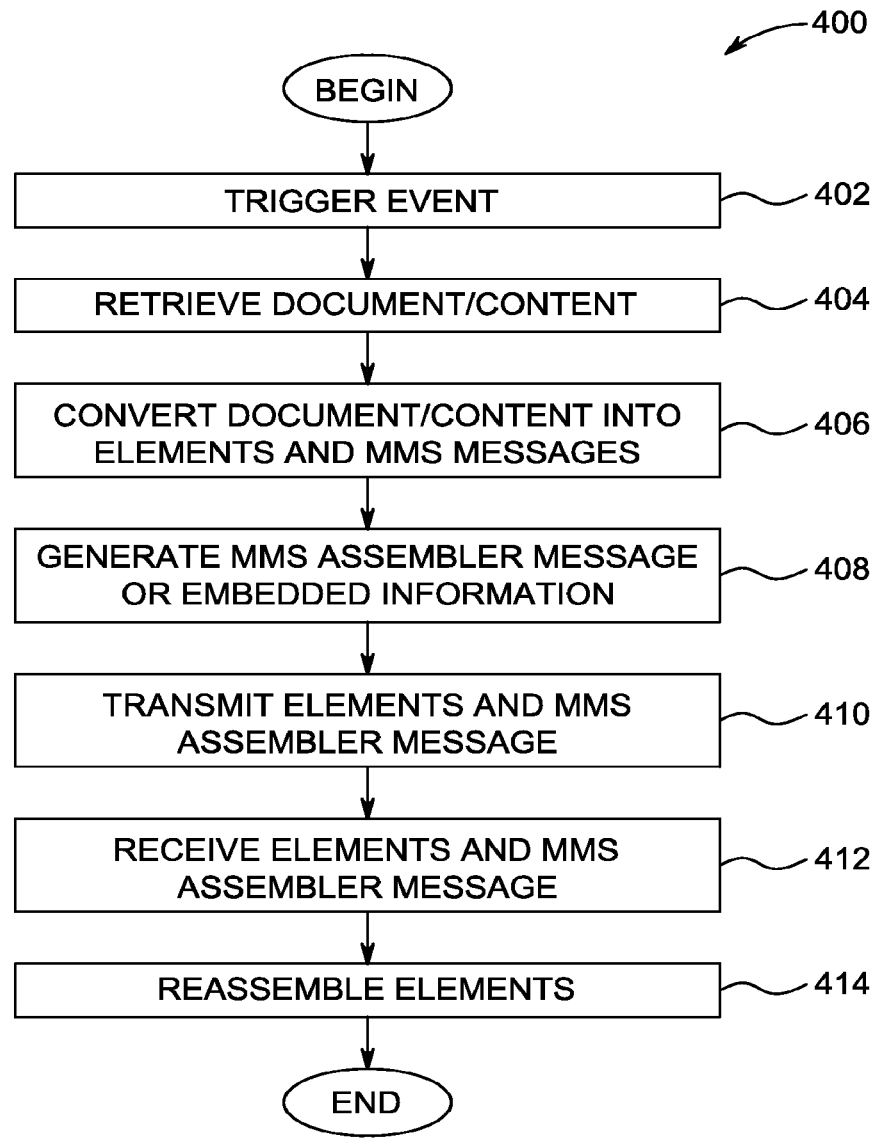
FIG. 4 is a diagram of a method for providing converted mass media documents, multimedia documents, or any multimedia content using Multimedia Messaging Service (MMS) in accordance with another embodiment of the present invention.

FIG. 4 is a diagram of method 400 for providing converted mass media documents, multimedia documents, or any multimedia content using Multimedia Messaging Service (MMS). A trigger event (402) causes the retrieval (404) of documents or content to memory 302. Trigger event (402) may be a scheduled PUSH of information at a predetermined time, when a news story is generated, a user request for a multimedia document, a request from device 100 for a multimedia document including as a result of feedback received by one or more sensors 126, a request from device 200 for a multimedia document including as a result of feedback received by any one of sensors 126, or an initiation by server or computer 300.

Trigger event (402) may also be a change in the shape or bending of one or more electronic flexible screen or display devices 202 detected by the plurality of sensors 126 that generates a request for documents from server or computer 300. For this case, documents or content such as html or web content in addition to MMS messages can be delivered to device 318 responsive to the detected change of shape of one or more flexible screen or display devices 202. This may be done by embedding one or more sensors 126 in one or more flexible screen or display devices 202 or housing members 204 or 206 that detect a change in gradients of the flexible display.

In one embodiment of the present invention, the retrieval of documents or content (404) is triggered by initiating a "PRINT to MMS" function, a mouse click function requesting "SEND by MMS", or a "SEND MULTIMEDIA ONLY by MMS" function on server or computer 300 when configured as a personal computer that can be integrated into a single personal computer application, preferably without the need of any other third party software, and information transported by configuring one or more network adapters 312 as a cellular transceiver or any other wireless or wired communication technology to MMS user agent 316. A personal computer application may be a web browser where clicking on a link to download a document or a subset of a document also provides the option to download and send the content via a plurality of segments or elements in a plurality of MMS messages. In one embodiment, each multimedia element in the document that is compatible for transport via MMS may have an indicator, such as an icon, so that only compatible multimedia elements are selected for transport.

Having MMS capabilities on a personal computer enables easy transport and communication of information between a single personal computer application on computer 300 and device 318. Communication of personal computer content using MMS is advantageous since the number of devices supporting MMS is expected to outgrow the number of devices supporting mobile electronic mail.

For the "SEND MULTIMEDIA ONLY by MMS" function, photos, audio, and video are sent from the original document or content without the text in the document or content to the intended recipient. This is advantageous if a recipient only desires to see the multimedia content in the original document or content. When the MMS messages having elements $306_1$ to $306_3$ with only the multimedia content of the original document is received, device 100 or 200 may display the multimedia elements in a list or a cascade based on importance, size, date, quality, type, or any other criteria. If any of the MMS messages represent an advertisement in the original document, the placement of the advertisement on the displays of device 100 or 200 may be based on creating the greatest number of impressions to the user such as on the top, left hand side, or right hand side. Alternatively, received elements $306_1$ to $306_3$ may be placed in the same position on the displays of device 100 or 200 as they existed in the original document when received.

Referring again to device 100, trigger event (402) may also be GPS device 114 detecting a change in position in the case where device 100 is mobile. Using GPS, elements $306_1$ to $306_4$ may be transcoded into different audio, image, and video qualities if server or computer 300 determines that device 318 configured as device 100 is in a building, behind heavy foliage, in a tunnel, approaching an unfavorable position in the network, or the like. GPS device 114 can also be used by server or computer 300 to determine when to push a particular advertisement depending on the location of device 318. This is advantageous for providing localized advertising information.

For the case that power source 112 receives wireless power from wireless power transmitter 320, trigger event (402) may be a change in the proximity to a wireless power coverage area requiring transcoding of subsequent elements $306_1$ to $306_4$. If the wireless power coverage area is strong, elements $306_1$ to $306_4$ may be transcoded into higher quality audio, image, and video since the required increased processing power can be compensated for by the wireless power transmitter 320. If the wireless power coverage area is weak elements $306_1$ to $306_4$ may be transcoded into lower quality audio, image, and video in order to conserve power.

Referring again to device 200, trigger event (402) may also be caused on device 200 by one or more sensors 126 detecting motion such as rotation. When device 200 is rotated 214, content is loaded on the second electronic flexible screen or display device 203 and the one or more electronic flexible screen or display devices 202 is turned off. Another trigger event (402) in accordance with the present invention is when one or more sensors 126 detect a bending of one or more electronic flexible screen or display devices 202 indicating that the device has been folded or its shape altered, such as made circular, cubicle, or the like. If flexible screen or display devices 202 is folded or bent, the delivered MMS messages received by device 200 will be altered or resized to fit the new shape. For each trigger event (402), a request is sent to computer 300 for a multimedia document or content subsequent to the trigger event on device 200.

Subsequent to retrieval (404), the document or content is extracted, parsed, and/or segmented into a plurality of elements $306_1$ to $306_4$ and each converted into individual MMS messages (406) by converter engine 304. Each element $306_1$ to $306_4$ comprises an individual video, image, audio, or text information of the document or content. Optionally, an MMS assembler message may then be generated (408) in order for the recipient MMS user agent 316 to know how to properly reassemble the received elements. Rather than an independent MMS assembler message, the position and placement information within the original document or content of the information delivered in each MMS message may be embedded in the header or body of the MMS message for proper reassembly. Alternatively, a template of a page or publication may be stored on device 100 and used to properly reassemble all the transmitted and received MMS elements into the original document.

Elements $306_1$ to $306_4$ representing the original document or content are then transmitted over network 314 using a plurality of MMS messages with optionally the MMS assembler message (410) to MMS user agent 316. The MMS messages are then received optionally with the MMS assembler message (412). The original document or content is then reassembled optionally using the MMS assembler message or embedded information (414).

Figure 5:
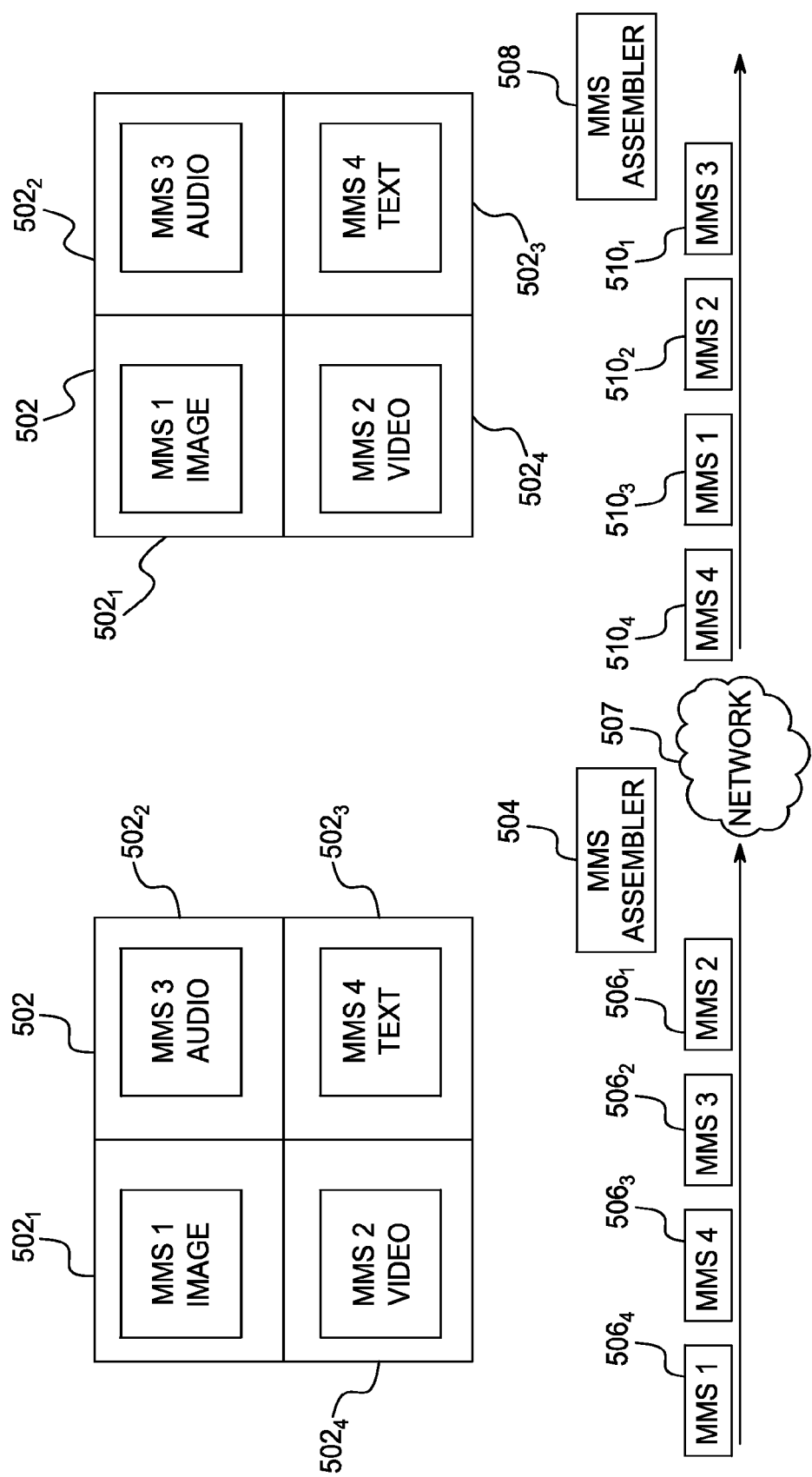
FIG. 5 is a diagram of communicating converted mass media, multimedia documents, or any multimedia content using a plurality of MMS messages in accordance with another embodiment of the present invention.

FIG. 5 is a diagram of communicating converted mass media, multimedia documents, or any multimedia content using a plurality of MMS messages. A multimedia document or content 502 is either extracted, parsed, and/or segmented into image element $502_1$, audio element $502_2$, text element $502_3$, and video element $502_4$ and an MMS message is generated for each element. An MMS assembler message 504 may optionally be generated having information to properly reassemble converted document or content 502. Alternatively, each MMS message having any one of elements $502_1$ to $502_4$ may have embedded information for reassembling the converted document or content 502. The embedded information includes placement or positioning information of the image, audio, text, or video element within the original document or content. MMS messages $506_1$-$506_4$ and optionally MMS assembler message 504 is communicated over network 507 in any order. MMS messages $502_1$-$502_4$ are received as elements $510_1$-$510_4$ along with MMS assembler message 508. The original multimedia document or content 502 is reassembled as each element is received and displayed in segments.

Although the features and elements of the present invention are described in the preferred embodiments in particular combinations, each feature or element can be used alone without the other features and elements of the preferred embodiments or in various combinations with or without other features and elements of the present invention. The present invention may be implemented in a computer program tangibly embodied in a computer-readable storage medium for execution by a processor or a general purpose computer for use with or by any non-volatile memory device. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and Digital Versatile Disks (DVDs). Types of hardware components or processors which may be used by or in conjunction with the present invention include Application Specific Integrated Circuits (ASICs), Field Programmable Gate Arrays (FPGAs), microprocessors, or any integrated circuit.

What is claimed is:

1. An electronic device that has first and second opposing sides, the electronic device comprising:
   a foldable display configured to display content at the first side;
   an additional display that is configured to display content at the second side;
   at least one sensor configured to detect folding of the foldable display; and
   circuitry configured to:
      resize an image displayed on the foldable display in response to the at least one sensor detecting folding of the foldable display;
      display content on the additional display while the additional display is positioned at a front of the electronic device; and
      load content on the foldable display and stop displaying content on the additional display in response to detecting the foldable display being positioned at the front of the electronic device.

2. The electronic device defined in claim 1, wherein the at least one sensor is configured to detect folding of the foldable display into a given shape and wherein the circuitry is configured to resize the image displayed on the foldable display based on the given shape.

3. The electronic device defined in claim 1, wherein the at least one sensor is configured to detect that a shape of the foldable display has been altered and wherein the circuitry is configured to resize the image displayed on the foldable display in response to the at least one sensor detecting that the shape of the foldable display has been altered.

4. The electronic device defined in claim 3, wherein the circuitry is configured to resize the image displayed on the foldable display to fit the shape of the foldable display in response to the at least one sensor detecting that the shape of the foldable display has been altered.

5. The electronic device defined in claim 1, wherein the foldable display is an organic light-emitting diode display.

6. An electronic device having first and second opposing sides, the electronic device comprising:
   a housing;
   a foldable display coupled to the housing, wherein the foldable display is configured to display content at the first side;
   an additional display coupled to the housing, wherein the additional display is configured to display content at the second side;
   one or more sensors configured to obtain sensor data; and
   circuitry configured to:
      turn off the additional display and display content on the foldable display in response to the sensor data; and
      resize an image displayed on the foldable display in response to the sensor data.

7. The electronic device defined in claim 6, wherein resizing the image displayed on the foldable display in response to the sensor data comprises resizing the image displayed on the foldable display in response to the one or more sensors detecting folding of the foldable display.

8. The electronic device defined in claim 6, wherein the one or more sensors are configured to detect folding of the foldable display into a given shape and wherein the circuitry is configured to resize the image displayed on the foldable display based on the given shape.

9. The electronic device defined in claim 6, wherein the one or more sensors are configured to detect folding of the foldable display into a given shape and wherein the circuitry is configured to resize the image displayed on the foldable display to fit the given shape.

10. The electronic device defined in claim 6, wherein the foldable display is an organic light-emitting diode display.

11. The electronic device defined in claim 6, wherein turning off the additional display and displaying content on the foldable display in response to the sensor data comprises turning off the additional display and displaying content on the foldable display in response to detecting rotation.

12. An electronic device having first and second opposing sides, the electronic device comprising:
   a housing;
   a foldable display coupled to the housing, wherein the foldable display is configured to display content at the first side;
   an additional display coupled to the housing, wherein the additional display is configured to display content at the second side;
   one or more sensors configured to obtain sensor data; and
   circuitry configured to display content on only the additional display while the first side faces a front of the electronic device and load content on the foldable display and stop displaying content on the additional display in response to the sensor data.

13. The electronic device defined in claim 12, wherein the circuitry is configured to resize an image displayed on the foldable display in response to the sensor data.

14. The electronic device defined in claim 12, wherein the foldable display is an organic light-emitting diode display.

* * * * *